Oct. 5, 1954
A. F. FLOURNOY
2,690,743
HEAT STORING SERVING DISH
Filed Aug. 9, 1947
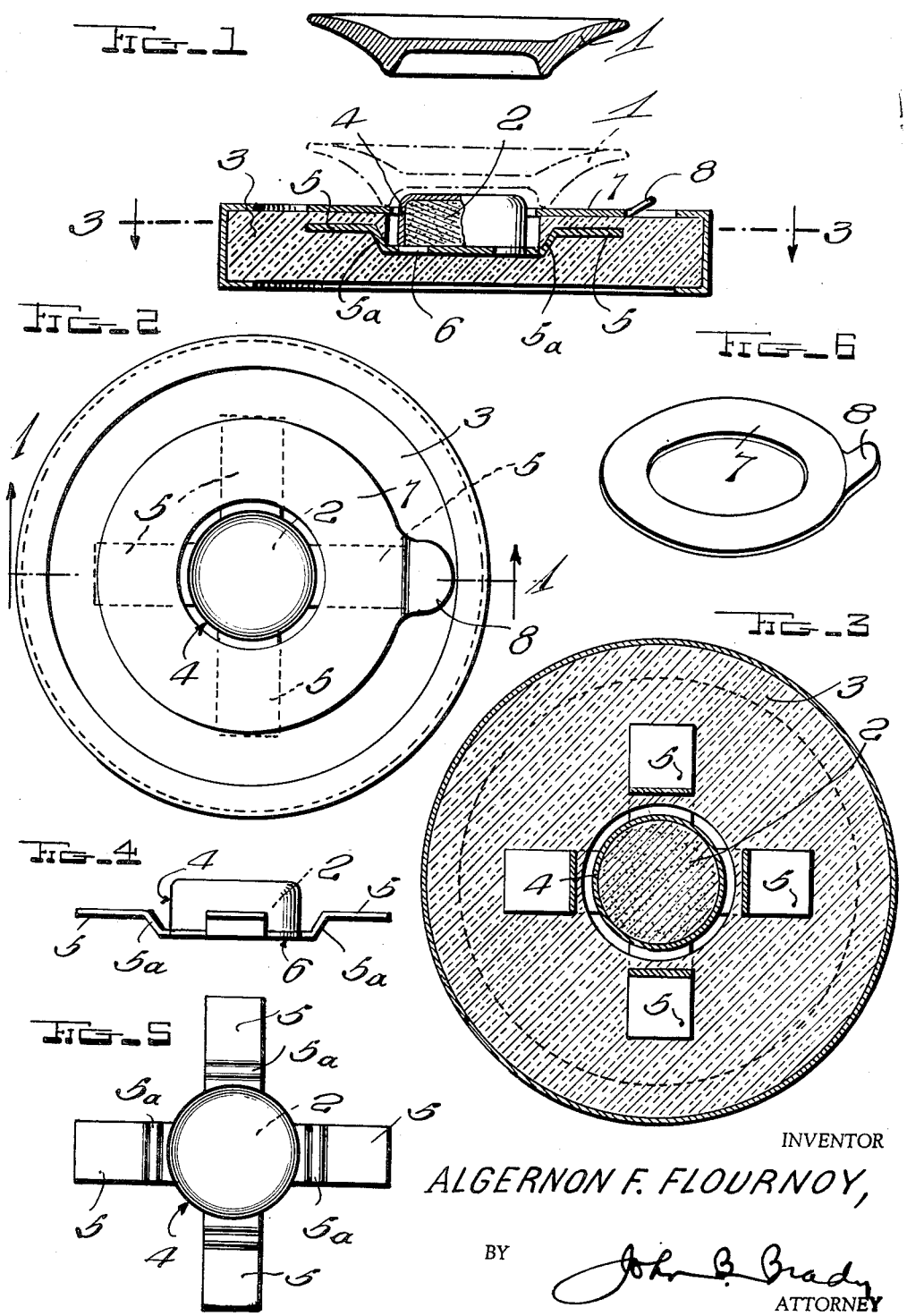
INVENTOR
ALGERNON F. FLOURNOY,
BY
ATTORNEY Patented Oct. 5, 1954

2,690,743

UNITED STATES PATENT OFFICE 2,690,743

HEAT STORING SERVING DISH

Algernon F. Flournoy, Shreveport, La., assignor, by decree of distribution, to Margaret Thurston Flournoy Application August 9, 1947, Serial No. 767,837

2 Claims. (Cl. 126—246)

My invention relates to food serving ware generally, but more particularly to a type of food serving ware adapted to store up heat for the purpose of maintaining food served in the ware at a pleasingly palatable temperature during the consumption of the food served.

The developments of the prior art that relate to the problem of maintaining food at pleasingly palatable temperatures, while accomplishing some beneficial results, have failed to supply the serving ware trades with a product to meet a long standing popular demand. Since the prior developments in this art have resorted to using only the simple latent heat of a substance as a source of heat for maintaining the temperature of food served such prior developments have fallen short of accomplishing the desideratum. The fundamental drawback lies in the fact that even a substance having a high simple latent heat factor heat storing capacity, that still is less than the heat emission capacity of the substance during the time it takes the average family to eat.

My invention employs a heating principle not made use of before in serving ware as far as I know. In my invention I employ not only the simple latent heat of a substance but also the selection of substances that have high latent heats of fusion and melting points within the range of the boiling point of water (212° F.), or below, that will give out heat upon solidifying that when conducted through the bottom and side walls of a serving vessel will maintain the food served at a pleasingly palatable temperature for a substantially long time at a substantially constant temperature.

The main object of my invention is to provide types of serving ware such as serving dishes, cups, pots, etc. provided with heat storing substances characterized by having high latent heat of fusion characteristics and melting points within the general range of the boiling point of water (212° F.), or below, which substances during their solidification will maintain the food served in such serving vessels incorporating these substances at pleasingly palatable temperatures.

Another object of my invention is to provide a detachable heating means for use with serving dishes, pots, and the like wherein the heating means embodies a heat storing substance having a high latent heat of fusion characteristic and a melting point in the range of the temperature of boiling water (212° F.), or below, which heat storing substances are adapted to dissipate heat into a serving vessel at a rate sufficient to maintain food served in the vessel at a pleasingly palatable temperature for a substantial length of time.

Another object of my invention is to provide a metallic or high heat resistant ceramic cooking and serving vessel which embodies a heat storing substance characterized by having a high latent heat of fusion characteristic and a melting point in the range of the boiling point of water (212° F.), or below, which heat storing substance during solidification will give up heat at a sufficient rate to maintain food served in the vessel at a pleasingly palatable temperature and which heat storing substance will without disintegrating stand heating at higher cooking temperatures during prolonged cooking periods which characteristic of the heat storing substance permits the vessel to be used not only as a cooking vessel but also as a serving vessel, the temperature of which will drop down low enough to permit the vessel to be handled with bare hands.

Other objects and advantages of my invention will appear in the following detailed description of various forms of serving ware illustrated in my accompanying drawings.

Figure 1 is a cross sectional view showing the heating means of my invention showing the association thereof with a serving dish, the serving dish being illustrated in full lines displaced from the heating means and in dotted lines supported over the heating means;

Fig. 2 is a top plan view of the heating means of my invention and illustrating an insulating spacing washer disposed over the heating means for elevating shallow dishes over the metallic receptacle forming part of the heating means;

Fig. 3 is a transverse sectional view taken on line 3—3 of Fig. 2 and illustrating the members embedded in the base member for supporting the heating means;

Fig. 4 is a side elevational view of the heating means employed in the device of my invention;

Fig. 5 is a top plan view of the heating means illustrated in Fig. 4; and

Fig. 6 is a perspective view of the insulating spacing washer which may be placed on top of the base member to prevent dishes having shallow recesses from having to ride the metallic receptacle which contains the heating means.

Before entering into a detailed description of the heat storing serving dish of my invention illustrated in the accompanying drawings, a brief discussion of the principle of operation of my invention is in order. First of all, I point out that the heat that is stored up in the heating substances I employ in my invention is made up of the simple latent heat of the substance and its latent heat of fusion. By simple latent heat I mean that quantity of heat roughly calculated as the product of the number of degrees of rise in temperature of the substance times that quantity of heat in British thermal units (B. t. u.'s) required to raise the unit of substance one degree in temperature. By latent heat of fusion I mean that quantity of heat required to be put into the substance in its temperature melting range to bring about a physical change in the substance from its solid to its molten state.

The heat storing substances best adapted for use in my invention are those first of all characterized by having a high latent heat of fusion which adapts the substance to store up a considerable quantity of heat that will be dissipated upon the solidification of the substance at a substantially constant temperature. I have found that eutectic alloys composed of bismuth, antimony, tin and lead with melting points ranging from 225° F. down to 154° F. give satisfactory results when used as heat retaining substances. I have used these substances in amounts from ½ pound to one pound incorporated in serving dishes with satisfactory results. Among the alloys of the general class defined above that I found satisfactory were: Wood's alloy composed of Sn 12.9%, Pb 25.8%, Bi 48.4%, Cd 12.9% (melting point 154° F.); an alloy composed of Bi 50%, Sn 25%, Pb 25% (melting point 200° F.) Another alloy of a higher melting temperature, 255° F., composed of Bi 55½%, Pb 44½% was also found to be satisfactory when used below an insulating layer when incorporated in a piece of serving ware.

These alloys have latent heat of fusion factors of approximately 25 British thermal units per pound, the exact values of which may be found in standard chemical reference books.

A low melting point type of nylon plastic also gave satisfactory results. This substance was observed to have a high latent heat of fusion factor, which factor recommends its use in connection with my invention. However, since its melting point is above that of boiling water, it had to be treated in the manner elsewhere discussed in this specification to make it perform satisfactorily.

I have taken care, in the use of the various heat storing substances I have tried and found successful, to consider the construction of the serving vessels such as the thickness of the bottom wall in connection with the choice of a particular heat storing substance to make sure that the heat delivered to the food served in the vessel would be less than that sufficient to boil the water content of the food since the boiling of water would be a wasteful dissipation of the stored heat besides maintaining the food at too hot an eating temperature. In some cases the heat storing substance itself should be modified by the addition of some other substance of a much higher melting point in order to effect a diminished flow of heat from the substance even though its melting point is not changed. Some substances, while having high latent heat of fusion characteristics, are themselves such poor conductors of heat that the addition of an effective heat conductor such as comminuted aluminum or copper may be used to good advantage, preferably aluminum because it is light.

While I make mention in this specification of having used but two classes of substances as heat storing agencies, it is to be understood that my inventive concept envisions the use of any efficient heat storing agency whether it be an element or a chemical or physical combination of elements and whether it be used in a pure form or combined with a diluting substance either of a nature to retard the flow of heat or to accelerate the flow of heat.

It will be noted that throughout this description the use of alloys broadly as heat storing substances is discussed. The alloys that were tested were those chosen because of their relatively low specific gravity and high latent heat of fusion factor. While no doubt more efficient substances may be employed, very good results have been obtained in the use of these special alloys.

The alloy may be used in a pure form if sufficient space is allowed for expansion of the alloy and the cavity associated with the receptacle is designed to eliminate compression strain incident to the expansion of the alloy. A better way, however, is to use a mixture of finely divided alloy and an aggregate having a melting point much higher than the alloy. In this type of mixture the strength of the alloy as a solid metal is diminished while at the same time voids are provided in the mixture itself to allow for expansion of the alloy. A mixture of one part of alloy to one to two parts of finely divided perlite produced an excellent crumbly type of heat accumulating substance that may be nicely packed into recesses. The aggregate need not absorb the molten alloy. Perlite has proven to be an ideal aggregate for mixing with the type of alloys mentioned in this specification because the alloys wet the aggregate and therefore remain in a soaked up state in the perlite even under high temperatures. Should for any reason compressive forces be set up in the masses of alloy and perlite, the fragile particles of the bubble form of the perlite aggregate would be easily crushed to make room for movements of the alloy masses. It should be remembered that the alloy during the making of the serving dish will be heated hotter than it ever will be heated in the normal use of the dish, and will therefore make room for itself, if need be.

Those familiar with the metallurgy art and related chemical arts will understand that if a pure metal or alloy having a high latent heat of fusion is trapped in a container, the heat that is employed in melting the alloy, metal or other substance is thrown off at a temperature the same or only slightly less than the temperature at which the substance was melted. The great advantage in using the latent heat of fusion is that it is thrown off at a substantially constant temperature. Hence, a piece of serving ware made according to the teachings of my invention as described above has many advantages over solid plates.

My serving ware may be designed to emit its heat at practically any desired temperature. An alloy is selected that meets the particular need, the eating temperature desired. There are a number of factors that can be taken advantage of in producing the desired temperature, such as the thickness of the bottom of the serving dish, the proportions of the alloy and the aggregate mix. When need be, the rate of heat flow from a pure alloy or a mixture of alloy and aggregate may be increased by the addition of an efficient heat conductor such as the finely divided aluminum mentioned above. Consequently, food that is placed on a dish embodying my invention will remain hot during an entire meal. In actual practice, I have produced serving dishes made according to my invention that kept food up to a palatably hot temperature for more than forty-five minutes.

Referring to the drawings in detail I have shown a standard dish 1 in combination with a detachable heating means 2 designed for use with it. The heating means 2 is comprised generally of an insulating base member 3 in which is fastened a sealed metallic receptacle 4 welded or otherwise fastened to members 5 formed out of the center portion of a heat radiating disc 6. Most of the heat thrown out of the bottom of the receptacle 4 will be radiated out of the top of the insulating base member 3 to prevent the same from becoming hot enough to stick to a table surface. Since standard dishes vary slightly as to the depth of their bottom recesses, I include in this form of my invention an insulating spacing washer 7 which may be placed on top of the base member 3 to prevent dishes having shallow recesses from having a ride the metallic receptacle 4. To facilitate handling spacing washer 7 an upwardly extending lug 8 is provided at one side thereof. Receptacle 4 encloses the heat storing substance heretofore described as having a high latent heat of fusion and a melting point ranging between 100° F. and 300° F. The members 5 which extend from the center portion of the heat radiating disc 6 support the heating means 2 centrally of the insulating base member 3. The metallic receptacle 4 facilitates the transfer of heat from the material in the container or receptacle to the associated dish 1 by heat conduction. The members 5 are each bent at an angle represented at 5a to support the heating means 2 in such a position with respect to insulating base member 3 that the top of the receptacle 4 projects only slightly above the top of the base member 3 as illustrated in Fig. 1. The serving dish may be placed in contacting relation with the top of the metallic receptacle 4 which encloses the heat storing substance. The insulating spacing washer 7 operates as a shim to prevent the wobbling of a dish having a recess in the bottom thereof which is too shallow to escape the top of the metallic receptacle 4.

While I have described my invention in certain of its preferred embodiments I realize that modifications may be made and I desire that it be understood that no limitations upon my invention are intended other than may be imposed by the scope of the appended claims.

Having thus described my invention, I claim:

1. A heating device for use with serving dishes or the like comprising a flat bottom insulating base member, a metal receptacle mounted on said base member having its upper surface exposed, said receptacle constituting a heat conductor and containing a heat storing substance having a high latent heat of fusion and a melting point ranging between 100° F. and 300° F., and washer plate means disposed on the top of said member and surrounding said receptacle, said means determining the vertical height of said base member relative to said upper surface and adapted to maintain a serving plate in position on said base member.

2. A heating device for use with serving dishes or the like comprising a flat bottom insulating base member, a metallic member having a multiplicity of extending arms embodied in said insulating base member and terminating in a centrally disposed heat-conductive plate spaced below the upper surface of said base member, a metal receptacle mounted on said centrally disposed heat-conductive plate and projecting above the upper surface of said insulating base member, said receptacle constituting a heat conductor and containing a heat storing substance having a high latent heat of fusion and a melting point ranging between 100° F. and 300° F. and a washer plate removably supported on the upper surface of said base member and surrounding said receptacle projecting centrally therethrough and an upwardly extending lug on one side of said washer plate means for facilitating the mounting and removal of said washer plate means with respect to said base member, said washer plate means determining the vertical height of said base member relative to said upper surface and adapted to maintain a serving plate in position on said base member immediately above said receptacle.

References Cited in the file of this patent

UNITED STATES PATENTS

| Number | Name | Date |
|---|---|---|
| 468,147 | Berger et al. | Feb. 2, 1892 |
| 730,337 | Bonnefont | June 9, 1903 |
| 780,352 | Kafka | Jan. 17, 1905 |
| 859,850 | Sliga | July 9, 1907 |
| 1,049,385 | Mohrenwitz | Jan. 7, 1913 |
| 1,172,404 | Szotak | Feb. 22, 1916 |
| 1,412,717 | Stowell | Apr. 11, 1922 |
| 1,850,166 | Bell | Mar. 22, 1932 |
| 1,881,873 | Newcomb | Oct. 11, 1932 |
| 2,400,643 | Hermann | May 21, 1946 |

FOREIGN PATENTS

| Number | Country | Date |
|---|---|---|
| 10,930 | Great Britain | 1845 |
| 115,114 | Germany | Nov. 26, 1900 |
| 336,576 | Germany | May 6, 1921 |
| 712,926 | France | Aug. 3, 1931 |